June 4, 1935.  D. W. HICKEY  2,003,538
PIPE ELBOW
Filed Oct. 6, 1932  2 Sheets-Sheet 1

Inventor
Daniel W. Hickey
By Stryker & Stryker
Attorneys

June 4, 1935.　　　　D. W. HICKEY　　　　2,003,538
PIPE ELBOW
Filed Oct. 6, 1932　　　　2 Sheets-Sheet 2

Inventor
Daniel W. Hickey

Patented June 4, 1935

2,003,538

UNITED STATES PATENT OFFICE 2,003,538

PIPE ELBOW

Daniel W. Hickey, St. Paul, Minn.

Application October 6, 1932, Serial No. 636,463

2 Claims. (Cl. 285—204)

It is an object of this invention to provide a novel and inexpensive pipe elbow adapted for use in pipe systems where the joints are formed by welding.

A further object is to provide an elbow of this kind comprising a plurality of straight, integral segments and wherein the passage is without restrictions and the ends are arranged to connect with pipes having square ends.

A further object is to provide a novel and inexpensive method of making such an elbow from a straight section of pipe.

Heretofore elbows have been formed from straight sections of pipe but their ends have been disposed obliquely to the axes of the pipes with which the elbow is to connect and this necessitates accurate cutting of the oblique ends of the pipe with resulting expense and difficulty in welding. The present invention avoids such difficulty.

The invention will be best understood by reference to the accompanying drawings in which the preferred form of my invention is illustrated. Referring to the drawings.

Figure 1:
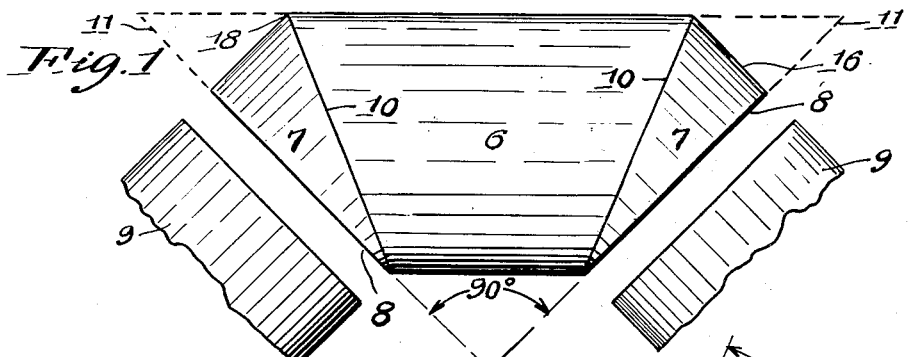
Figure 1 is a side elevation showing one of my improved elbows together with fragmentary portions of the pipes to which it is to be connected.

My improved elbow has a central portion 6 of straight, tubular or cylindrical form and two similar end portions 7 which are integral with the portion 6 and formed with circular ends 8 to be connected to pipes 9 having square ends adapted to register with the ends 8 and to be welded thereto (see Fig. 1). The central portion 6 at each end plane 10 is elliptical and the adjoining ends of the portions 7 are, of course, elliptical.

The method of forming the elbow is illustrated in Figs. 2, 3, 4 and 5. The first step is to cut from a straight piece of pipe a short section 11 having its ends 12 cut in planes which intersect at approximately the angle of the elbow. A 90 degree elbow is illustrated in the drawings and for such an elbow the ends of the section 11 are cut at angles of about 45 degrees to the axis of the pipe so that the ends 12 lie in planes extending at 90 degrees to each other. The next step is to cut away at each end of the section 11 an approximately triangular segment 13 at what is to be the outer side or periphery of the elbow. The width of this segment 13 in the plane of the end 12 is determined by the excess of the periphery of the section 11 at the end 12 over the periphery of the pipe 9 to which the elbow is to be connected. This will be better understood by reference to Fig. 5 in which the ellipse 14 represents the periphery of the section 11 at its end 12 and the circle 15 represents the periphery of the end 8 of the elbow which is to correspond to the periphery of the pipe 9. The arc a—b of the ellipse 14 represents the excess of the periphery of said ellipse over the periphery of the circle 15 and the figure a—b—c (including said arc a—b) is the projection of the segment 13 in the plane of the end 12. The extent of the segment 13 longitudinally of the pipe determines the extent of each portion 7 of the elbow at the outer periphery thereof and the plane 10 extends through point 18 at the inner extremity of the segment 13 and intersects the plane of the end 12 at the diametrically opposite periphery of the section 11 relative to point 18. The angle of the plane 10 is preferably equal to one-half of the angle formed by the end 12 with the axis of the pipe section 11, or one-fourth of the angle of the elbow. Such an angle for the plane 10 avoids any restriction in the elbow.

Figure 2:
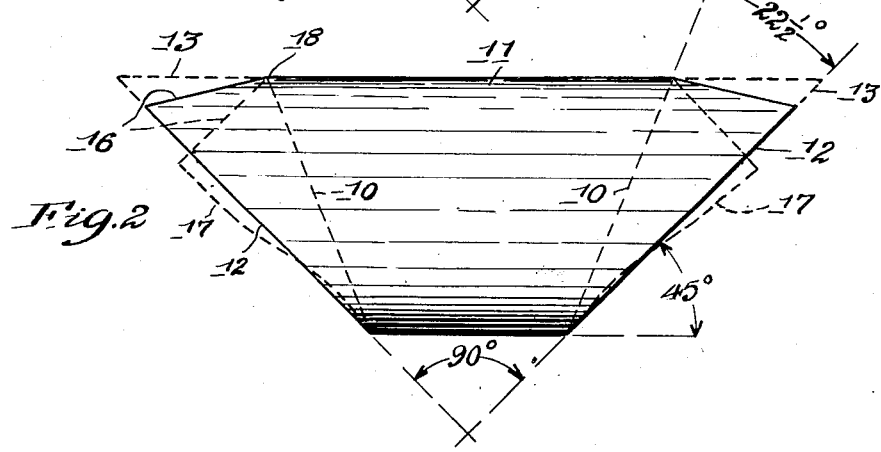
Fig. 2 is a side elevation of a section of pipe cut to form the elbow and before the end portions are shaped.
Figure 3:
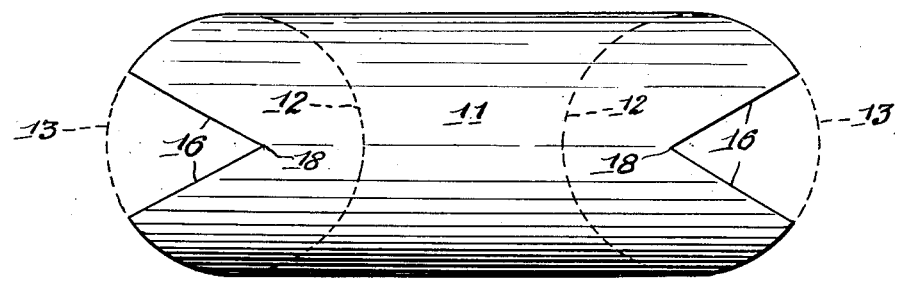
Fig. 3 is a top plan view of the section of pipe shown in Fig. 2.
Figure 4:
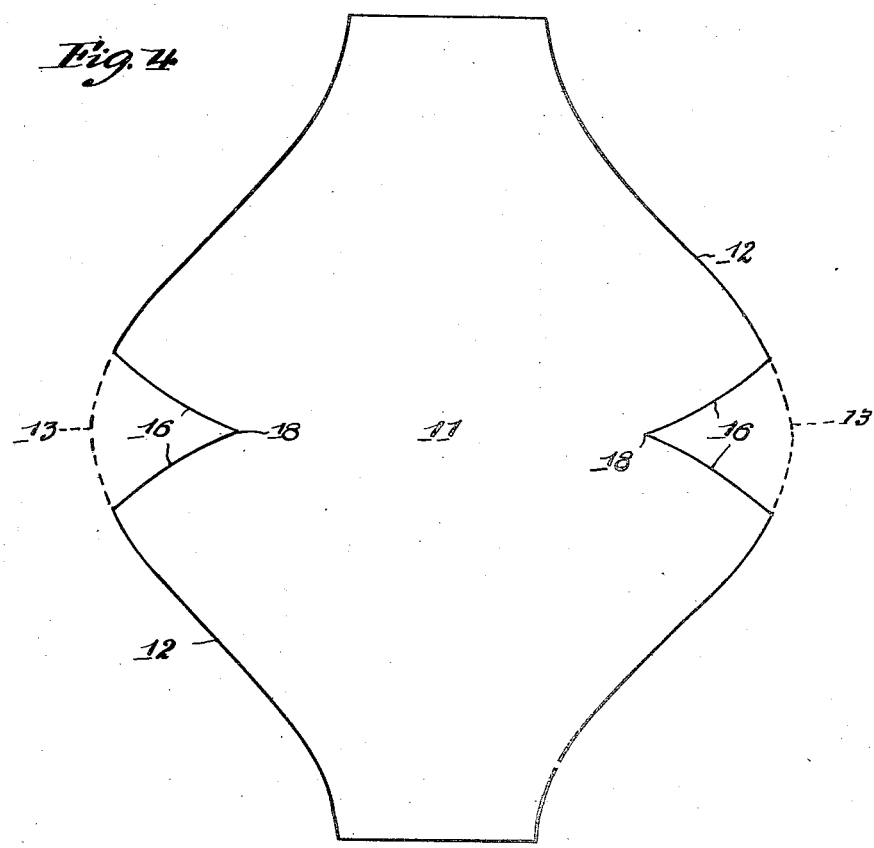
Fig. 4 is a plan view of a development of the exterior surface of the elbow.
Figure 5:
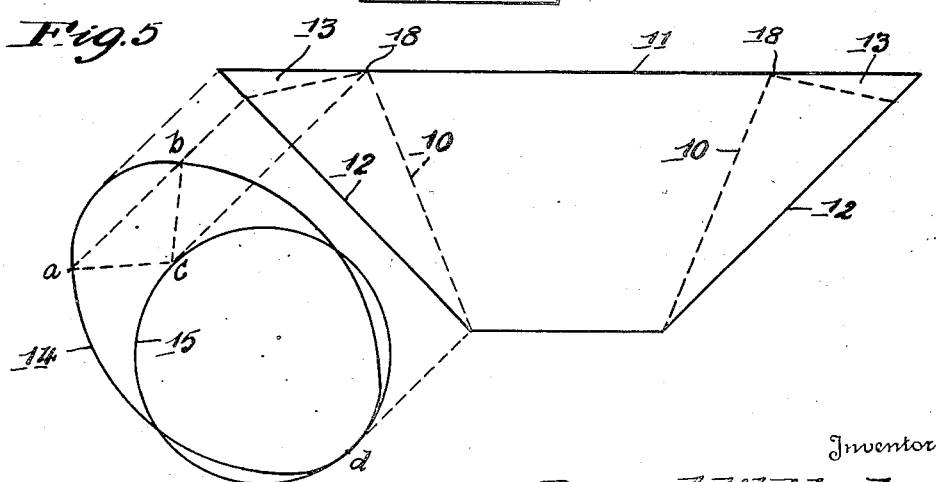
Fig. 5 is a diagrammatic view illustrating how the end portion of the elbow is formed.

After cutting away the segments 13 of the section 11 the openings formed by said segments are closed by bringing the edges 16 of the pipe together and reshaping the portions between the planes 10 and ends 12 to form the circular end 8 of the elbow. As shown in Fig. 5, the end of the elbow is reformed from the elliptical arc a—d—b to the form of the circle 15. Finally the edges 16 are welded together and the ends 8 are ground or otherwise trimmed to form straight, plane ends 8. This final trimming is only necessary when the ends 12 are cut entirely in straight planes in which case the shaping of the end portions 7 of the elbow leaves irregular edges, as indicated by the dotted lines 17 (Fig. 2). As an alternative, the ends 12 may be cut on suitable irregular curves designed to compensate for the shaping of the portions 7.

The finished elbow is without seams, except for the short, longitudinally extending seams at the edges 16 of the end portions 7. It will be understood that the expression "angle of the elbow" herein refers to the total change in direction secured by the elbow. My improved elbows may be made to produce any of the standard or other angular turns or changes in direction as desired.

Having described my invention, what I claim as new and desire to protect by Letters Patent is:

1. A pipe elbow formed from malleable sheet metal comprising a straight, cylindrical, central portion and two similar end portions adjoining the opposite ends respectively of said central portion and having seamless connections therewith, said central portion being without seams and said end portions each having a longitudinal seam at its outer periphery.

2. A pipe elbow formed from malleable sheet metal comprising a straight, cylindrical, central portion having elliptical ends and two similar end portions adjoining said ends respectively of said central portion and having seamless connections therewith, said end portions each having a longitudinal seam at its outer periphery and a circular end extending in a plane forming the angle of the elbow with a similar end on the opposite end portion.

DANIEL W. HICKEY.